US012662257B2

(12) United States Patent
Kim et al.

(10) Patent No.: US 12,662,257 B2
(45) Date of Patent: Jun. 23, 2026

(54) SPACE VEHICLE COMPRISING COOLING SYSTEM

(71) Applicant: The Boeing Company, Chicago, IL (US)

(72) Inventors: Gregory Kim, Redondo Beach, CA (US); Thomas Rust, III, Manhattan Beach, CA (US)

(73) Assignee: The Boeing Company, Arlington, VA (US)

( * ) Notice: Subject to any disclaimer, the term of this patent is extended or adjusted under 35 U.S.C. 154(b) by 1191 days.

(21) Appl. No.: 16/808,022

(22) Filed: Mar. 3, 2020

(65) Prior Publication Data

US 2021/0276738 A1 Sep. 9, 2021

(51) Int. Cl.
B64G 1/50 (2006.01)
B64G 1/58 (2006.01)
F25B 37/00 (2006.01)

(52) U.S. Cl.
CPC ................. B64G 1/50 (2013.01); B64G 1/58 (2013.01); *F25B 37/00* (2013.01)

(58) Field of Classification Search
CPC ............. B64G 1/50; B64G 1/506; B64G 1/58
See application file for complete search history.

(56) References Cited

U.S. PATENT DOCUMENTS 3,086,372 A * 4/1963 Love .......................... F28D 7/16
62/50.7
3,180,270 A * 4/1965 Arnts .................... F04D 29/049
384/321

(Continued)

FOREIGN PATENT DOCUMENTS

CN 110636740 A 12/2019
JP H01109798 A 4/1989
(Continued)

OTHER PUBLICATIONS

European Patent Office, Extended European Search Report Issued in Application No. 21159766.1, Jul. 13, 2021, Germany, 8 pages.
(Continued)

*Primary Examiner* — Michael H Wang
(74) *Attorney, Agent, or Firm* — Alleman Hall LLP

(57) ABSTRACT

A space vehicle is described. The space vehicle comprises one or more heat-producing components, and a closed loop cooling system configured to remove heat generated by the one or more heat-producing components. The closed loop cooling system comprises a coolant passageway defining a closed loop, a coolant located within the coolant passageway, the coolant comprising a static pressure of 100 pounds per square inch or lower and the coolant being in a single liquid phase through the coolant passageway, and one or more pumps configured to move the coolant through the coolant passageway. The closed loop cooling system further comprises a first heat exchange component disposed along the coolant passageway, the first heat exchange component configured to transfer heat from the heat-producing components to the coolant, and a second heat exchange component disposed along the coolant passageway, the second heat exchange component configured to remove heat from the coolant.

30 Claims, 4 Drawing Sheets

(56) References Cited

U.S. PATENT DOCUMENTS

| | | | | |
|---|---|---|---|---|
| 4,324,375 A * | 4/1982 | O'Neill | | F28F 1/00 |
| | | | | 165/76 |
| 4,865,123 A * | 9/1989 | Kawashima | | H05K 7/20272 |
| | | | | 165/104.19 |
| 4,997,034 A * | 3/1991 | Steffen | | F28F 9/001 |
| | | | | 165/104.34 |
| 5,101,884 A * | 4/1992 | Leidinger | | F28F 1/08 |
| | | | | 165/172 |
| 5,351,747 A * | 10/1994 | Koeppl | | F28F 13/00 |
| | | | | 165/104.31 |
| 5,815,370 A * | 9/1998 | Sutton | | H05K 7/20281 |
| | | | | 361/689 |
| 6,810,946 B2 * | 11/2004 | Hoang | | F28D 15/043 |
| | | | | 165/104.24 |
| 7,174,950 B2 * | 2/2007 | Jacque | | F28D 15/0275 |
| | | | | 165/41 |
| 8,991,194 B2 * | 3/2015 | Edwards | | F25B 21/02 |
| | | | | 62/3.2 |
| 11,285,039 B2 * | 3/2022 | Steele | | B01J 20/28052 |
| 2003/0072666 A1 * | 4/2003 | Katsukura | | F01C 21/02 |
| | | | | 418/206.7 |
| 2009/0219693 A1 * | 9/2009 | Dittmer | | F28F 23/00 |
| | | | | 165/104.31 |
| 2016/0363381 A1 * | 12/2016 | Cho | | F28D 15/0275 |
| 2019/0168458 A1 * | 6/2019 | Puigardeu Aramendia | | |
| | | | | B29C 64/165 |
| 2020/0048522 A1 * | 2/2020 | Doucet | | C10G 3/50 |

FOREIGN PATENT DOCUMENTS

| | | |
|---|---|---|
| JP | H09250892 A | 9/1997 |
| JP | 2019514741 A | 6/2019 |
| WO | 2014179044 A1 | 11/2014 |
| WO | 2017196346 A1 | 11/2017 |

OTHER PUBLICATIONS

Japan Patent Office, Office Action Issued in Application No. 2021-032771, Oct. 1, 2024, 15 pages.

* cited by examiner

200

SPACE VEHICLE COMPRISING COOLING SYSTEM

FIELD

The disclosure relates to space vehicles, and more particularly to space vehicles comprising closed loop cooling systems.

BACKGROUND

A space vehicle includes various components that generate heat. For example, a satellite can include a payload, such as an imaging system or antenna array, that generates heat during operation. To maintain a component within a desired operational temperature range, a space vehicle can include a cooling system that removes heat generated by the heat-producing component. Some cooling systems for space vehicles employ passive mechanisms to dissipate heat, such as heat pipes and heat spreaders. However, passive cooling systems place an upper limit on heat dissipation, constraining payload output and thus space vehicle design. For example, some passive cooling systems can limit payload component power to less than 20 Watts, and power densities to less than 40 Watt/in$^2$.

Some cooling systems for space vehicles employ ammonia as a coolant. However, ammonia is toxic, and can create compatibility issues with other materials—for example, in the presence of water or hydroxides, ammonia can corrode aluminum, which is commonly used in space vehicle components. Further, ammonia is highly pressurized (e.g., 400 psi) in some cooling systems. High pressures can pose higher risks of leakage, which can degrade cooling performance and thus component performance, and in some scenarios can cause catastrophic failure of a pumped fluid cooling system. Ammonia-based cooling systems also can exhibit significant performance degradation above 80° C. These and other issues combine to make the storage, distribution, and use of ammonia-based coolant in space vehicles burdensome, hazardous, and limiting with respect to space vehicle design.

Thus, in view of the above, challenges exist in cooling space vehicle components.

SUMMARY

To address the above issues, according to one aspect of the present disclosure, a space vehicle is provided. In this aspect, the space vehicle comprises one or more heat-producing components, and a closed loop cooling system configured to remove heat generated by the one or more heat-producing components. The closed loop cooling system comprises a coolant passageway defining a closed loop, a coolant located within the coolant passageway, the coolant comprising a static pressure of 100 pounds per square inch or lower and the coolant being in a single liquid phase through the coolant passageway, and one or more pumps configured to move the coolant through the coolant passageway. The closed loop cooling system further comprises a first heat exchange component disposed along the coolant passageway, the first heat exchange component configured to transfer heat from the heat-producing components to the coolant, and a second heat exchange component disposed along the coolant passageway, the second heat exchange component configured to remove heat from the coolant.

Another aspect of the present disclosure relates to a space vehicle comprising one or more heat-producing components, and a closed loop cooling system configured to remove heat generated by the one or more heat-producing components. In this aspect, the closed loop cooling system comprises a coolant passageway defining a closed loop, a hydrocarbon coolant located within the coolant passageway, the hydrocarbon coolant being in a single liquid phase through the coolant passageway, and one or more pumps configured to move the hydrocarbon coolant through the coolant passageway. The closed loop cooling system further comprises a first heat exchange component disposed along the coolant passageway, the first heat exchange component configured to transfer heat from the heat-producing components of the payload to the hydrocarbon coolant, and a second heat exchange component disposed along the coolant passageway, the second heat exchange component configured to remove heat from the hydrocarbon coolant.

Yet another aspect of the present disclosure relates to a space vehicle comprising a payload comprising one or more heat-producing components, and a vehicle platform comprising a closed loop cooling system configured to remove heat generated by the one or more heat-producing components of the payload. In this aspect, the closed loop cooling system comprises a coolant passageway defining a closed loop, the coolant passageway comprising a platform coolant passageway portion and a payload coolant passageway portion, a coolant located within the coolant passageway, and one or more pumps configured to move the coolant through the coolant passageway. The closed loop cooling system further comprises a first heat exchange component disposed along the payload coolant passageway portion, the first heat exchange component configured to transfer heat from the heat-producing components of the payload to the coolant, quick disconnect fittings coupling the platform coolant passageway portion to the payload passageway portion, and a second heat exchange component disposed along the platform coolant passageway portion, the second heat exchange component configured to remove heat from the coolant.

Yet another aspect of the present disclosure relates to a space vehicle comprising a payload comprising one or more heat-producing components, and a closed loop cooling system configured to remove heat generated by the one or more heat-producing components of the payload. In this aspect, the closed loop cooling system comprises a coolant passageway defining a closed loop, a coolant located within the coolant passageway, one or more pumps configured to move the coolant through the coolant passageway, and one or more additively manufactured heat exchange components located along the coolant passageway.

The features, functions, and advantages that have been discussed can be achieved independently in various embodiments or may be combined in yet other embodiments, further details of which can be seen with reference to the following description and drawings.

DETAILED DESCRIPTION

Figure 1:
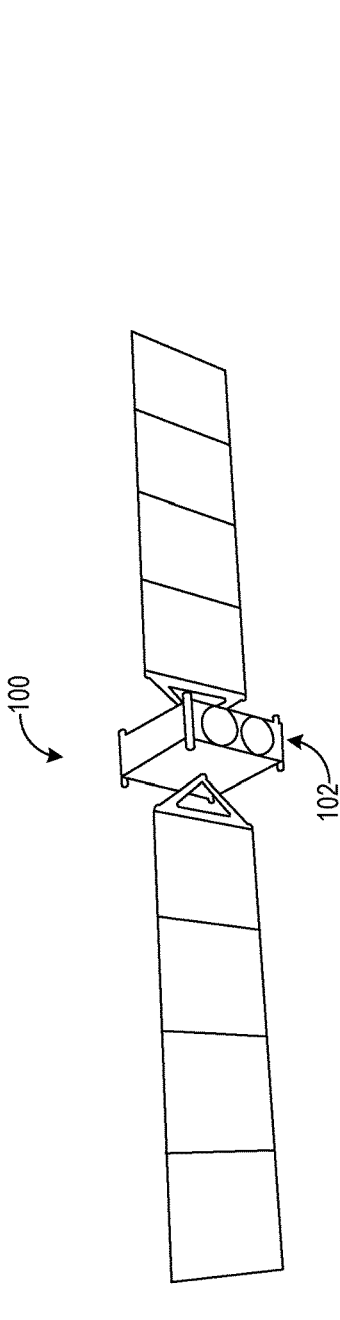
FIG. 1 shows an illustration depicting an example space vehicle comprising a cooling system according to an embodiment of the present disclosure.
Figure 1:

In view of the considerations discussed above, examples are disclosed that relate to space vehicles comprising closed loop cooling systems. Briefly, one example cooling system includes a coolant passageway defining a closed loop, a single-phase liquid coolant located within the coolant passageway, and one or more pumps configured to move the coolant through the coolant passageway. A first heat exchange component disposed along the coolant passageway transfers heat from heat-producing components (e.g., components of a space vehicle payload) to the coolant, and a second heat exchange component disposed along the coolant passageway removes heat from the coolant, thereby rejecting the heat from the space vehicle. In some examples, the single-phase liquid coolant comprises a static pressure of 100 pounds per square inch absolute (psia) or lower (e.g. as low as 4 psia in some examples). Pressures in this regime can help to reduce risks of coolant leakage compared to higher pressure cooling systems, and can facilitate manufacturing and filling of the cooling system at ambient pressures. In some examples, quick disconnect fittings are used to connect platform and payload portions of a cooling system, further helping to simplify manufacturing, integration, and test. In contrast with passive cooling structures, which in some examples can limit payload component power to less than 20 Watts and power densities to less than 40 Watt/in$^2$, a cooling system as disclosed herein can, in some examples, increase thermal management capability to allow for payload component power as high as 150 Watts, power densities of 200 Watts/in$^2$ or higher, and operating temperatures up to 150° C. under various conditions.

In some examples, the coolant comprises a hydrocarbon-based liquid, such a liquid comprising one or more C8-C15 alkanes, alkenes, alkynes, and/or aromatics. In a more specific example, the coolant comprises a mixture of C8-C15 isoalkanes having freezing and boiling points selected such that the coolant remains in a single liquid phase throughout operational temperature and pressure ranges. Such a coolant also can be selected to have a sufficiently high thermal conductivity (e.g., between 0.08 to 0.2 W/m-K) and sufficiently high specific heat (e.g., between 1.5 to 3.0 KJ/kg-K) to enable the cooling system to dissipate relatively large amounts of heat at suitably high densities for a desired application, supporting higher power and more complex payloads. In some examples, the coolant can dissipate relatively large amounts of heat while being pumped at temperatures up to 100° C., and in other examples up to 150° C. In contrast, ammonia-based coolants may exhibit significant performance degradation over 80° C. Further, as hydrocarbon coolants are not oxidizing, such coolants can reduce the likelihood of corrosion to platform and payload cooling system components compared to the use of coolants such as ammonia and water, and in some examples can function as a suitable lubricant and coolant for a pump that circulates the coolant. Such coolants also can be dielectric, enabling the coolants to be pumped over electronics. Further, such coolants can show acceptable levels of hydrogen production when exposed to radiation similar to that encountered in space.

FIG. 1 illustrates an example space vehicle comprising a cooling system according to an embodiment of the present disclosure. In this example, the space vehicle takes the form of a satellite 100 carrying a payload 102 including heat-producing components. In some examples, the payload 102 can comprise transmit and receive antenna arrays for communications. Further, in some examples, the payload 102 can comprise an imaging system (e.g., a radar imaging system, optical imaging system, microwave imaging system, and/or infrared imaging system). Other examples of heat-producing components that can be incorporated into the satellite and/or payload include a sensor system (e.g., for measuring operational aspects of satellite 100), and a computer system (e.g., for controlling operation of satellite 100). The term "space vehicle" as used herein refers both to actively driven space vehicles and passively moving space vehicles.

Figure 2:
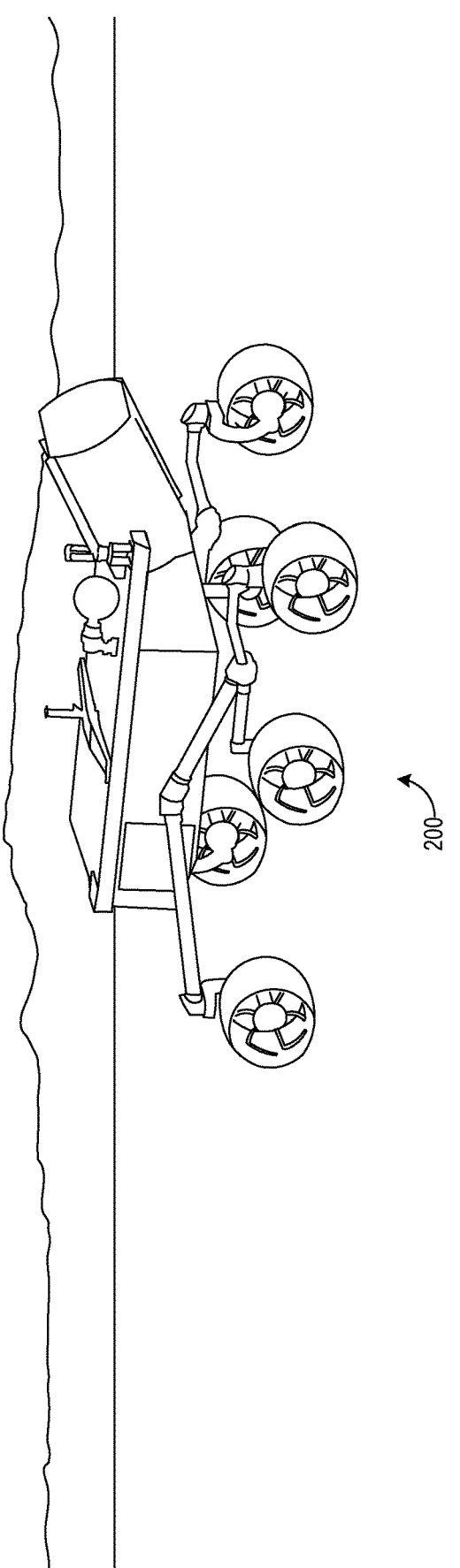
FIG. 2 shows an illustration depicting an example space vehicle comprising a cooling system according to another embodiment of the present disclosure.

FIG. 2 illustrates another example of a space vehicle comprising a cooling system according to an embodiment of the present disclosure. The example space vehicle takes the form of a rover 200, which may be used to explore surfaces of extraterrestrial bodies. Rover 200 can include any of a variety of heat-generating components, including but not limited to image sensing and analysis components, chemical sensors and analysis components, radiation detectors and analysis components, mechanical systems, optical and radiofrequency communications systems, and inter-satellite links. The space vehicles of FIGS. 1 and 2 are presented for the purpose of example, and the example cooling systems described herein can be implemented in any suitable space vehicle to cool any suitable heat-producing components, whether the components are part of a payload portion or platform portion of the space vehicle. Further examples of space vehicles include crewed and uncrewed spaceships.

Figure 3:
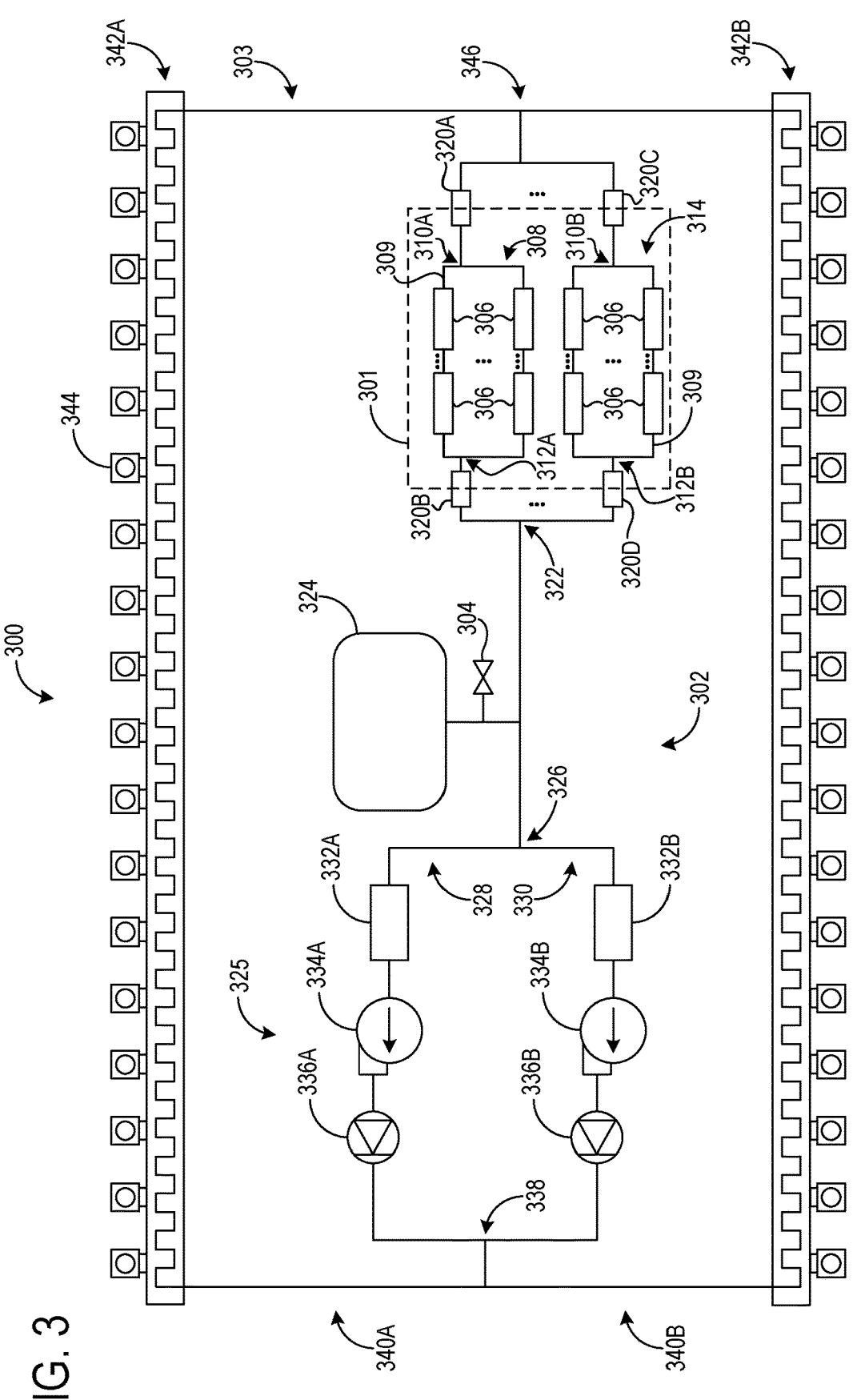
FIG. 3 shows an illustration schematically depicting an example cooling system for a space vehicle according to an embodiment of the present disclosure.

FIG. 3 schematically illustrates an example closed-loop cooling system 300 for a space vehicle, such as the example space vehicles described above. The depicted cooling system 300 comprises a payload portion 301 that is integrated with a payload comprising heat-producing components, and a platform portion 302 joined to payload portion 301, wherein platform portion 302 comprises active components of the cooling system 300, such as pumps for circulating a coolant.

Cooling system 300 comprises a coolant passageway 303 forming a continuous closed loop through which coolant flows. Passageway 303 includes a fill/drain valve 304 with which coolant can be supplied to and drained from the passageway 303. To remove heat from heat-producing elements of the payload, payload portion 301 of cooling system 300 includes a plurality of heat-exchange components, such as cold plates 306, which are in thermal communication with the heat-producing component(s) of the payload. Cold plates 306 transfer heat from the heat-producing components to a liquid-phase coolant circulating through payload portion 301 of cooling system 300. As described in more detail below, the coolant remains in a liquid phase throughout its circulation through passageway 303, and thus is referred to herein as a single-phase liquid coolant, in contrast to coolants that remove heat through phase change processes, such as evaporation/condensation processes.

Cold plates 306, and/or other heat-exchange components, can be provided along coolant passageway 303 in any suitable number and arrangement. In the depicted example, cold plates 306 are arranged in two parallel groups. In a first group 308, parallel coolant passageway segments 309 each includes two or more cold plates 306, and share a common inlet 310A and a common outlet 312A. In a second group 314, parallel coolant passageway segments 309 each includes two or more cold plates 306, and share a common inlet 310B and a common outlet 312B. In this example, cold plates 306 in first group 308 transfer heat from a first heat-producing component to the coolant in passageway 303, and cold plates 306 in second group 314 transfer heat from a second heat-producing component to the coolant in the passageway. With inlets 310 and outlets 312 arranged in parallel, groups 308 and 314 enable the first and second heat-producing components to be cooled in parallel. Further, the parallel arrangement of groups 308 and 314 can reduce a drop in coolant pressure across payload portion 301. In other examples, cold plates can be arranged in series, rather than partially or fully in parallel. Further, a plurality of segments can be provided each with one or more cold plates, with two or more segments sharing a common inlet and/or outlet. Alternatively or additionally, one or more segments of the plurality of segments can have a dedicated inlet and/or outlet not shared with other segments.

In some examples, cold plates 306 remove heat generated by a payload that includes antenna arrays. In such examples, cold plates 306 in first group 308 can cool a transmitter antenna array, while cold plates 306 in second group 314 can cool a receiver transmitter array. In other examples, cold plates 306 can be configured to remove heat from any other suitable heat-producing components of a space vehicle payload or platform. Further, a cooling system can implement any other suitable arrangement and number of cold plates than those shown in the depicted example.

In some examples, payload portion 301 is coupled to platform portion 302 via quick disconnect (QD) fittings 320. In the depicted example, four QD fittings are used to couple payload portion 301 and platform portion 302: a first QD fitting 320A couples inlet 310A of first group 308 to platform portion 302, a second QD fitting 320B couples outlet 312A of first group 308 to platform portion 302, a third QD fitting 320C couples inlet 310B of second group 314 to platform portion 302, and a fourth QD fitting 320D couples outlet 312B of second group 314 to platform portion 302. In other examples, any other suitable number of QD fittings can be used to couple payload and platform portions 301 and 302, based upon a number and arrangement of cold plates and components to be cooled.

The use of QD fittings 320 to join payload portion 301 and platform portion 302 of cooling system 300 can enable various advantages in manufacturing, testing, and deploying cooling system 300. For example, QD fittings 320 can enable payload and platform portions 301 and 302 to be independently tested and operated upon, and then easily joined together, without performing welding or other permanent coupling processes. This can improve manufacturing and testing efficiencies relative to cooling systems in which portions cannot be rapidly disconnected and connected. Further, the rapid connection/disconnection via QD fittings 320 can enable payload and platform portions 301 and 302 to be moved separately during manufacturing and transport.

From the cold plates 306, the parallel flows of coolant combine at a junction 322. From junction 322, the flow proceeds past an accumulator 324. Accumulator 324 is partially filled with coolant, and regulates coolant pressure within passageway 303. Accumulator 324 can compensate for changes in coolant volume (e.g., due to changes in coolant density and/or temperature), and for leakage of coolant from system 300. Accumulator 324 can assume any suitable form, such as that of a bellows accumulator. Further, accumulator 324 can be chargeable following its arrangement along passageway 303, or can be pre-charged with one or more gases (e.g., helium, argon and/or nitrogen). It will be understood that the term "single phase liquid coolant" used to describe the coolant in passageway 303 does not exclude some vapor pressure of the coolant within accumulator 324 and/or other locations within the closed loop, but rather refers to the absence of phase change processes being used by cooling system 300 as principal mechanisms for heat transfer.

From accumulator 324, the coolant flows to a pumping stage 325 configured to circulate the coolant through passageway 303. The depicted pumping stage 325 comprises a branch 326 at which coolant passageway 303 splits into a first segment 328 and a second segment 330 arranged in parallel with the first segment 328. First segment 328 includes a first filter 332A, a first pump 334A, and a first check valve 336A. Likewise, second segment 330 includes a second filter 332B, a second pump 334B, and a second check valve 336B. Filters 332 separate particulates from coolant to thereby provide filtered coolant to pumps 334. Particulates can arise during operation of cooling system 300, for example from operation of pumps 334 and erosion of surfaces of passageway 303, and also from manufacturing, as examples. The separation of particulates from coolant can help to reduce further erosion and protect bearings in pumps 334 (e.g. hydrodynamic bearings), for example. Any suitable filters can be used—as one example, each filter 332 can comprise a 10-25 micron absolute filter rating with up to 1 gram of AC dust or higher capacity. Further, any suitable filter arrangement can be used. As another example, a single filter can be provided upstream of pumps 334.

The pumps of coolant system 300 can be operated either alone or together in various examples. In some examples, one pump is intended to be operational at a time, with the other pump being provided as a backup pump in case the operational pump experiences performance issues. Pump operation can be monitored via any suitable sensor(s), including but not limited to a thermistor and/or pressure sensor. In other examples, a cooling system can include any other suitable number and arrangement of pumps—for example, three or more pumps (with can be redundant or non-redundant), or a single pump. Where multiple pumps are employed, the pumps can be arranged in parallel (as shown), or in series. Further, any suitable type of pump can be used (e.g. a centrifugal pump in some examples), and can be controlled via any suitable control scheme, including but not limited to closed-loop spin-speed control (e.g., based on output from one or more Hall effect sensors). Check valves 336 enable one-way flow of coolant in a downstream direction, thus averting backflow of coolant to a pump that is not active.

Pumping stage 325 increases the pressure of filtered coolant. As one illustrative example, pumping stage 325 can receive coolant pressurized approximately between 4 and 50 psi, and output coolant at pressures between 14 and 100 psi. The flow of coolant downstream of check valves 336 proceeds to a junction 338 at which first and second segments 328 and 330 of coolant passageway 303 meet.

From junction 338, the coolant flow splits into parallel segments 340A and 340B that pass through a first heat rejection cold plate (HRCP) 342A and a second HRCP 342B, respectively. In some examples, HRCPs 342 comprise brazed aluminum cold plates. In other examples, HRCPs 342 can take any other suitable form, such as additively manufactured forms. In the depicted example, each HRCP 342 is coupled to a plurality of heat pipes (e.g., heat pipe 344) to transfer heat out of the HRCP. HRCPs 342 and heat pipes 344 represent one example of a heat exchange component, and other implementations can employ any other suitable heat exchange components, including but not limited to other heat radiators and spreaders. Further, system 300 can implement any suitable numbers of HRCPs 342 and heat pipes 344. For example, in other implementations the output from segments 328 and 330 can combine to flow toward a single HRCP, plural HCRPs arranged in series, or toward three or more parallel segments that each comprise one or more HRCPs.

As coolant passes through HRCPs 342, heat contained in the coolant is transferred to the HRCPs 342 and heat pipes 344, and thereby is rejected from system 300. In this way, heat generated by the heat-producing components of payload portion 301 is removed from system 300. After passing through HRCPs 342, flow proceeds to a junction 346 at which the outflow of each HRCP 342 combines. Here, the cooled coolant is again supplied to cold plates 306 in payload portion 301.

As noted above, the fluid used as the coolant remains in a single liquid phase throughout the passageway 303, and thereby removes heat from the heat-producing components and rejects the heat from the space vehicle without utilizing phase transitions as principal heat-transfer processes. In some examples, the coolant is configured to be in a liquid phase within a temperature range of −80° C. to 150° C. As mentioned above, a single-phase liquid coolant can comprise a vapor pressure above the liquid phase (e.g. in the accumulator).

In some examples, the coolant is circulated at relatively low pressures, such as pressures of 100 psi or lower (e.g. as low as 4 psi in some examples). The use of such low coolant pressures can reduce the likelihood of coolant leakage from passageway 303, such as at seals and joints of passageway 303. Further, the coolant can be liquid at atmospheric pressure (e.g. 1 atmosphere) and room temperature (e.g. 25° C.), which can facilitate the filling of passageway 303 and testing of system 300 during manufacturing, without equipment that would otherwise be used to achieve and maintain higher coolant pressures.

Figure 4:
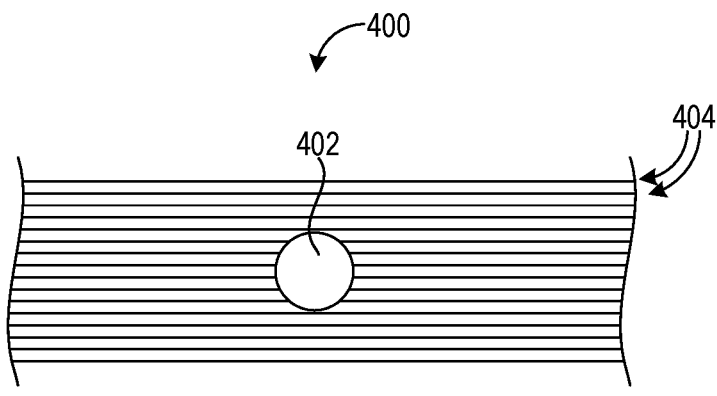
FIG. 4 shows an illustration depicting an example additively manufactured heat exchange component according to an embodiment of the present disclosure.

Further, low coolant pressures can reduce the material and/or structural requirements imposed on heat-exchange components that conduct the coolant. For example, low pressures and the dielectric properties of the coolant can enable the coolant to flow in contact with electronics. As another example consequence of such reduced requirements, low coolant pressures can enable the use of additively manufactured components in system 300. FIG. 4 schematically illustrates an example additively manufactured cold plate 400, which can be used as a cold plate 306 or as an HRCP 342. FIG. 4 also schematically depicts a coolant passageway 402 formed in an interior of the cold plate 400. Passageway 402 represents passageway 303 of FIG. 3 in examples where cold plate 400 represents one of cold plates 306 or HRCP 342.

Cold plate 400 comprises a plurality of layers, two examples of which are indicated at 404, which are successively deposited to form cold plate 400. The use of a higher-pressure coolant can pose a risk of separating the layers of brazed assemblies, or of bursting or rupturing an additively manufactured cold plate. In contrast, the lower coolant pressures used in the examples disclosed herein may pose less risk of degrading the integrity of an additively manufactured part or other layered structures.

As mentioned above, the disclosed example cooling systems can utilize a single-phase hydrocarbon coolant. Any suitable hydrocarbon coolant can be used. In some examples, the coolant comprises a mixture of one or more C8-C15 alkanes (n-or iso-), alkenes, alkynes, and/or aromatics. In a more specific example, the coolant can comprise a mixture of C8-C15 isoalkanes. In another more specific example, can comprise one or more C10-C13 hydrocarbons, including one or more C10-C13 isoalkanes. Such hydrocarbon compounds may be relatively inexpensive compared to other coolants, such as fluorocarbon coolants. In yet other examples, any other suitable hydrocarbon coolants may be used. The hydrocarbon coolant can be selected to have a suitably low freezing point (e.g., approximately −85° C. at ordinary operating pressures) and a suitably high boiling point (e.g., 150° C. at ordinary operating pressures) to remain in a liquid phase throughout the coolant passageway.

Any suitable operating pressures can be used. In some examples, an operating pressure within a range of 4-100 psi can be used, or within a range of 20-75 psi. As mentioned above, the use of a relatively lower operating pressure can reduce the likelihood of coolant leakage and enable the use of additively manufactured components along the coolant passageway. Such hydrocarbon molecules are also larger than ammonia molecules or the molecules of other lighter molecular weight substances used as coolants. This can reduce a rate of coolant leakage through any small openings. Still further, the hydrocarbon coolant can function as a lubricant for one or more bearings in pumps 334. Alternatively or additionally, the hydrocarbon coolant can be used to cool a motor and/or other components in pumps 334. Other properties that may be used to select a coolant include thermal conductivity, specific heat, and viscosity (e.g., between 0.2 and 30 cP) within an operative temperature and pressure range.

In some examples, pumps 334 can be isolated via one or more structures that mitigate the propagation of vibration from the pumps 334 to other components in system 300. As one example, pumps 334 may be mounted to a support that is isolated from other structures of the cooling system 300 via dampening structures that absorb vibrations arising from operation of pumps 334.

System 300 can include various sensor devices for monitoring the operation of components therein. In some examples, sensor output can be transmitted to another location, for example as part of telemetry provided by a space vehicle implementing system 300. As examples, system 300 can include potentiometer(s) (e.g., for sensing the volume of fluids within accumulator 324), ammeter(s) (e.g., for monitoring operation of pumps 334 by way of current), Hall effect sensor(s) (e.g., for controlling operation of the pumps 334), temperature sensor(s) (e.g., at the inlets of pumps 334, inlets of HRCPs 342, and/or outlets of HRCPs 342), pressure transducer(s) (e.g., at the inlets and/or outlets of pumps 334 for sensing coolant pressure), flow rate sensor(s), and/or thermistor(s).

The active cooling enabled by pumped flow of coolant in system 300 can provide increased dissipation of heat generated by payloads relative to cooling systems that passively cool payloads. As such, system 300 supports the cooling of higher power payloads at higher power densities, in turn enabling the use of more complex payload architectures. Further, by supporting modifications in the number, arrangement, and type of components, system 300 supports implementation in a wide variety of space vehicles.

Another example provides a space vehicle comprising one or more heat-producing components, and a closed loop cooling system configured to remove heat generated by the one or more heat-producing components, the closed loop cooling system comprising a coolant passageway defining a closed loop, a coolant located within the coolant passageway, the coolant comprising a static pressure of 100 pounds per square inch or lower and the coolant being in a single liquid phase through the coolant passageway, one or more pumps configured to move the coolant through the coolant passageway, a first heat exchange component disposed along the coolant passageway, the first heat exchange component configured to transfer heat from the heat-producing components to the coolant, and a second heat exchange component disposed along the coolant passageway, the second heat exchange component configured to remove heat from the coolant. In such an example, the coolant alternatively or additionally can comprise a hydrocarbon. In such an example, the coolant alternatively or additionally can comprise one or more C10-C13 isoalkanes, and the coolant can be configured to be in a liquid phase between-80 degrees Celsius and 150 degrees Celsius at pressures at least between 4 and 100 pound per square inch. In such an example, the space vehicle can comprise a satellite. In such an example, the satellite can provide a platform to which a payload comprising the heat-producing components is coupled, and the coolant passageway can comprise a platform portion and a payload portion coupled together by quick disconnect fittings. In such an example, the one or more pumps can comprise a first pump and a second pump arranged in parallel along parallel coolant passageway segments. In such an example, the space vehicle alternatively or additionally can comprise a first check valve downstream of the first pump and upstream of a junction at which the parallel coolant passageway segments meet, and a second check valve downstream of the second pump and upstream of the junction. In such an example, the space vehicle alternatively or additionally can comprise a first filter located upstream of the first pump and a second filter located upstream of the second pump. In such an example, each pump of the one or more pumps alternatively or additionally can comprise one or more bearings, and the coolant can be a lubricant for the one or more bearings. In such an example, one or more of the first heat exchange component and the second heat exchange component can comprise an additively manufactured structure or other layered structure.

Another example provides a space vehicle comprising one or more heat-producing components, and a closed loop cooling system configured to remove heat generated by the one or more heat-producing components, the closed loop cooling system comprising a coolant passageway defining a closed loop, a hydrocarbon coolant located within the coolant passageway, the hydrocarbon coolant being in a single liquid phase through the coolant passageway, one or more pumps configured to move the hydrocarbon coolant through the coolant passageway, a first heat exchange component disposed along the coolant passageway, the first heat exchange component configured to transfer heat from the heat-producing components of a payload to the hydrocarbon coolant, and a second heat exchange component disposed along the coolant passageway, the second heat exchange component configured to remove heat from the hydrocarbon coolant. In such an example, hydrocarbon coolant alternatively or additionally can comprise one or more C8-C15 isoalkanes. In such an example, each pump of the one or more pumps can comprise one or more bearings, and the hydrocarbon coolant can be a lubricant for the one or more bearings. In such an example, the space vehicle can comprise a satellite. In such an example, the satellite can provide a platform to which a payload comprising the heat-producing components is coupled, and the coolant passageway can comprise a platform portion and a payload portion coupled together by quick disconnect fittings. In such an example, one or more of the first heat exchange component and the second heat exchange component can comprise an additively manufactured structure. In such an example, the coolant alternatively or additionally can comprise a static pressure of one hundred pounds per square inch or lower. In such an example, the one or more pumps alternatively or additionally can comprise a first pump and a second pump arranged in parallel along parallel coolant passageway segments. In such an example, the space vehicle alternatively or additionally can comprise a first check valve downstream of the first pump and upstream of a junction at which the parallel coolant passageway segments meet, and a second check valve downstream of the second pump and upstream of the junction. In such an example, the space vehicle alternatively or additionally can comprise a first filter located upstream of the first pump and a second filter located upstream of the second pump.

Another example provides a space vehicle comprising a payload comprising one or more heat-producing components, and a vehicle platform comprising a closed loop cooling system configured to remove heat generated by the one or more heat-producing components of the payload, the closed loop cooling system comprising a coolant passageway defining a closed loop, the coolant passageway comprising a platform coolant passageway portion and a payload coolant passageway portion, a coolant located within the coolant passageway, one or more pumps configured to move the coolant through the coolant passageway, a first heat exchange component disposed along the payload coolant passageway portion, the first heat exchange component configured to transfer heat from the heat-producing components of the payload to the coolant, quick disconnect fittings coupling the platform coolant passageway portion to the payload coolant passageway portion, and a second heat exchange component disposed along the platform coolant passageway portion, the second heat exchange component configured to remove heat from the coolant. In such an example, the coolant can comprise a static pressure of one hundred pounds per square inch or less. In such an example, the payload coolant passageway portion can comprise plural segments arranged in parallel. In such an example, the space vehicle alternatively or additionally can comprise a satellite, a first payload heat source can be configured to be cooled by a first payload coolant passageway segment, and a second payload heat source can be configured to be cooled by a second payload coolant passageway segment. In such an example, one or more of the first heat exchange component and the second heat exchange component can comprise an additively manufactured structure.

Another example provides a space vehicle comprising a payload comprising one or more heat-producing components, and a closed loop cooling system configured to remove heat generated by the one or more heat-producing components of the payload, the closed loop cooling system comprising a coolant passageway defining a closed loop, a coolant located within the coolant passageway, one or more pumps configured to move the coolant through the coolant passageway, and one or more additively manufactured heat exchange components located along the coolant passageway. In such an example, the coolant can comprise a static pressure of one hundred pounds per square inch or less. In such an example, the coolant alternatively or additionally can be in a single liquid phase throughout the close loop cooling system. In such an example, the coolant alternatively or additionally can be in a liquid phase. In such an example, the one or more additively manufactured heat exchange components can comprise aluminum cold plates.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A space vehicle, comprising:
one or more heat-producing components; and
a closed loop cooling system configured to remove heat generated by the one or more heat-producing components, the closed loop cooling system comprising
a coolant passageway defining a closed loop,
a hydrocarbon coolant located within the coolant passageway, wherein the hydrocarbon coolant is in a single liquid phase through the coolant passageway,
one or more pumps configured to move the hydrocarbon coolant through the coolant passageway,
a first heat exchange component disposed along the coolant passageway, the first heat exchange component configured to transfer heat from the heat-producing components to the hydrocarbon coolant, and
a second heat exchange component disposed along the coolant passageway, the second heat exchange component configured to remove heat from the hydrocarbon coolant.

2. The space vehicle of claim 1, wherein the space vehicle comprises a satellite.

3. The space vehicle of claim 2, wherein the satellite provides a platform to which a payload comprising the heat-producing components is coupled, and wherein the coolant passageway comprises a platform portion and a payload portion coupled together by quick disconnect fittings.

4. The space vehicle of claim 1, wherein the one or more pumps comprises a first pump and a second pump arranged in parallel along parallel coolant passageway segments.

5. The space vehicle of claim 4, further comprising a first check valve downstream of the first pump and upstream of a junction at which the parallel coolant passageway segments meet, and a second check valve downstream of the second pump and upstream of the junction.

6. The space vehicle of claim 4, further comprising a first filter located upstream of the first pump and a second filter located upstream of the second pump.

7. The space vehicle of claim 1, wherein each pump of the one or more pumps comprises one or more bearings, and wherein the hydrocarbon coolant is a lubricant for the one or more bearings.

8. The space vehicle of claim 1, wherein one or more of the first heat exchange component and the second heat exchange component comprises an additively manufactured structure or other layered structure.

9. The space vehicle of claim 1, wherein the hydrocarbon coolant comprises one or more C18-C15 isoalkanes.

10. A space vehicle, comprising:
one or more heat-producing components; and
a closed loop cooling system configured to remove heat generated by the one or more heat-producing components, the closed loop cooling system comprising
a coolant passageway defining a closed loop,
a hydrocarbon coolant located within the coolant passageway, wherein the hydrocarbon coolant is in a single liquid phase through the coolant passageway,
one or more pumps configured to move the hydrocarbon coolant through the coolant passageway,

12 a first heat exchange component disposed along the coolant passageway, the first heat exchange component configured to transfer heat from the heat-producing components of a payload to the hydrocarbon coolant, and
a second heat exchange component disposed along the coolant passageway, the second heat exchange component configured to remove heat from the hydrocarbon coolant.

11. The space vehicle of claim 10, wherein the hydrocarbon coolant comprises one or more C8-C15 isoalkanes.

12. The space vehicle of claim 10, wherein each pump of the one or more pumps comprises one or more bearings, and wherein the hydrocarbon coolant is a lubricant for the one or more bearings.

13. The space vehicle of claim 10, wherein the space vehicle comprises a satellite.

14. The space vehicle of claim 13, wherein the satellite provides a platform to which a payload comprising the heat-producing components is coupled, and wherein the coolant passageway comprises a platform portion and a payload portion coupled together by quick disconnect fittings.

15. The space vehicle of claim 10, wherein one or more of the first heat exchange component and the second heat exchange component comprises an additively manufactured structure.

16. The space vehicle of claim 10, wherein the one or more pumps comprises a first pump and a second pump arranged in parallel along parallel coolant passageway segments.

17. The space vehicle of claim 16, further comprising a first check valve downstream of the first pump and upstream of a junction at which the parallel coolant passageway segments meet, and a second check valve downstream of the second pump and upstream of the junction.

18. The space vehicle of claim 16, further comprising a first filter located upstream of the first pump and a second filter located upstream of the second pump.

19. A space vehicle, comprising:
a payload comprising one or more heat-producing components; and
a vehicle platform comprising a closed loop cooling system configured to remove heat generated by the one or more heat-producing components of the payload, the closed loop cooling system comprising
a coolant passageway defining a closed loop, the coolant passageway comprising a platform coolant passageway portion and a payload coolant passageway portion,
a hydrocarbon coolant located within the coolant passageway, wherein the hydrocarbon coolant is in a single liquid phase through the coolant passageway,
one or more pumps configured to move the hydrocarbon coolant through the coolant passageway,
a first heat exchange component disposed along the payload coolant passageway portion, the first heat exchange component configured to transfer heat from the heat-producing components of the payload to the hydrocarbon coolant,
quick disconnect fittings coupling the platform coolant passageway portion to the payload coolant passageway portion, and
a second heat exchange component disposed along the platform coolant passageway portion, the second heat exchange component configured to remove heat from the hydrocarbon coolant.

20. The space vehicle of claim 19, wherein the payload coolant passageway portion comprises plural segments arranged in parallel.

21. The space vehicle of claim 20, wherein the space vehicle comprises a satellite, wherein a first payload heat source is configured to be cooled by a first payload coolant passageway segment, and wherein a second payload heat source is configured to be cooled by a second payload coolant passageway segment.

22. The space vehicle of claim 19, wherein one or more of the first heat exchange component and the second heat exchange component comprises an additively manufactured structure.

23. The space vehicle of claim 19, wherein the hydrocarbon coolant comprises one or more C10-C13 isoalkanes.

24. The space vehicle of claim 19, wherein the space vehicle comprises a satellite.

25. The space vehicle of claim 19, wherein each pump of the one or more pumps comprises one or more bearings, and wherein the hydrocarbon coolant is a lubricant for the one or more bearings.

26. A space vehicle, comprising:
   a payload comprising one or more heat-producing components; and a closed loop cooling system configured to remove heat generated by the one or more heat-producing components of the payload, the closed loop cooling system comprising
      a coolant passageway defining a closed loop,
      a hydrocarbon coolant located within the coolant passageway, wherein the hydrocarbon coolant is in a single liquid phase through the coolant passageway,
      one or more pumps configured to move the hydrocarbon coolant through the coolant passageway, and
      one or more additively manufactured heat exchange components located along the coolant passageway.

27. The space vehicle of claim 26, wherein the one or more additively manufactured heat exchange components comprise aluminum cold plates.

28. The space vehicle of claim 26, wherein the hydrocarbon coolant comprises one or more C10-C13 isoalkanes.

29. The space vehicle of claim 26, wherein the space vehicle comprises a satellite.

30. The space vehicle of claim 26, wherein the one or more pumps comprises a first pump and a second pump arranged in parallel along parallel coolant passageway segments.

* * * * *